(No Model.)
G. ALBEE.
LAMP HANGER.
No. 487,977. Patented Dec. 13, 1892.
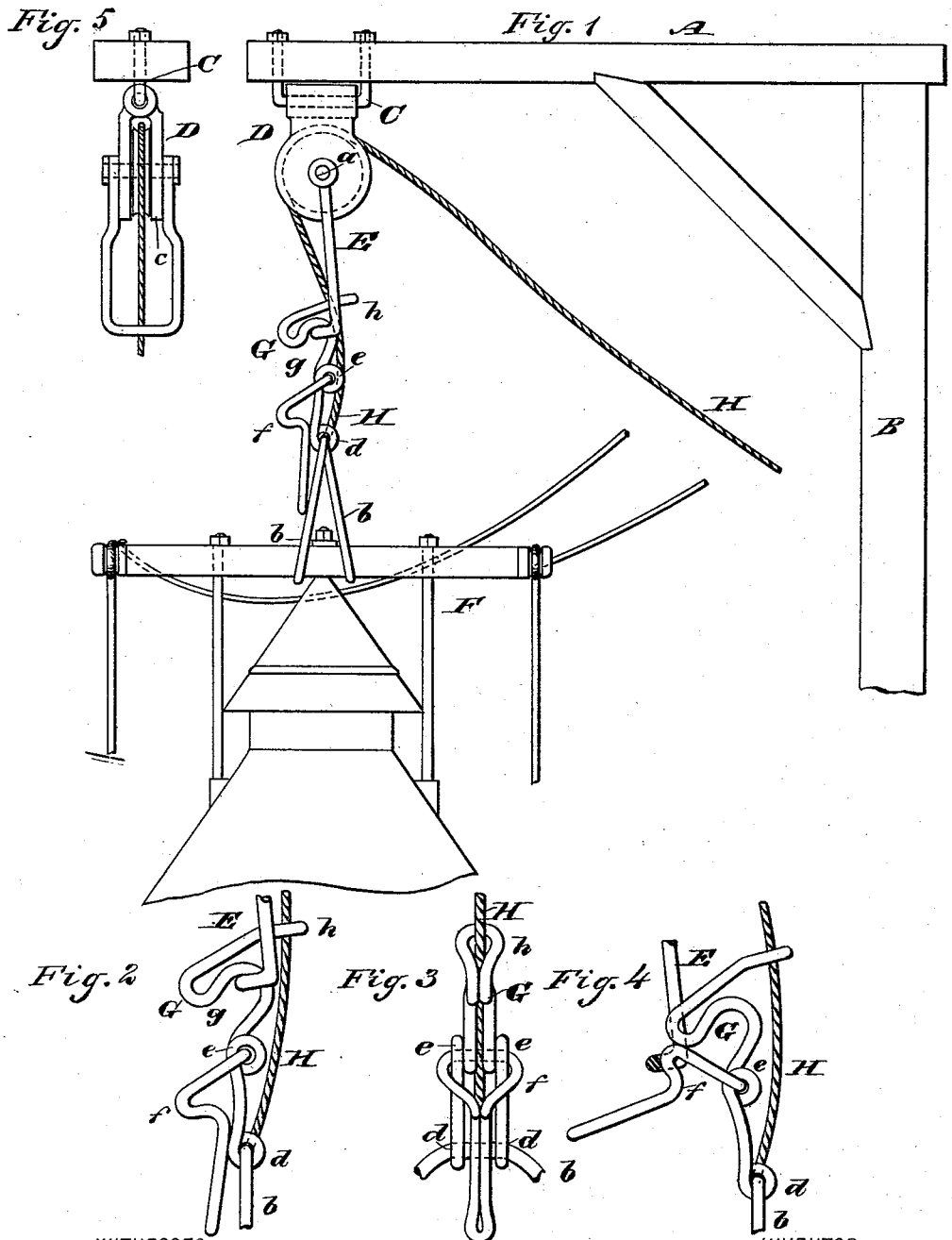
WITNESSES:
J. A. Bergstrom
C. Sedgwick
INVENTOR:
G. Albee
BY Munn & Co.
ATTORNEYS

UNITED STATES PATENT OFFICE.

GEORGE ALBEE, OF SUSQUEHANNA, PENNSYLVANIA.

LAMP-HANGER.

SPECIFICATION forming part of Letters Patent No. 487,977, dated December 13, 1892.

Application filed November 18, 1891. Serial No. 412,262. (No model.)

*To all whom it may concern:*

Be it known that I, GEORGE ALBEE, of Susquehanna, in the county of Susquehanna and State of Pennsylvania, have invented a new and Improved Lamp-Hanger, of which the following is a specification, reference being had to the annexed drawings, forming a part thereof, in which—

Figure 1 is a side elevation of my improved lamp-hanger, showing its application to an electric lamp. Fig. 2 is a side elevation of the hook used in the lamp-hanger. Fig. 3 is a front elevation of the same. Fig. 4 is a side elevation showing the action of the releasing device, and Fig. 5 is a front elevation of the pulley and suspension-loop.

Similar letters of reference indicate corresponding parts in all the views.

The object of my invention is to provide a simple and effective device for suspending electric lamps or lanterns, which may be manipulated by the suspension-rope without the necessity of climbing to the suspension device.

My invention consists in the construction and arrangement of parts hereinafter described and claimed.

To the bracket A, supported by the post B, is attached the loop C, from which is suspended the pulley-block D, the said pulley-block being capable of swinging laterally. The pulley-block D is provided with a suspension-loop E, attached to the pivotal pin $a$ of the pulley-block, the said loop being angled or bent forward at its lower end.

The electric lamp F, which is supported by the device, is connected by a pair of loops $b$ with the hook G. A rope H, attached to the loops $b$, extends upwardly over the pulley $c$ of the pulley-block D, and thence downward through suitable guides on the post B to a point within easy reach. The hook G is preferably formed of wire, although it may be cast or stamped out of sheet metal. It is provided with an eye $d$ at the lower end for receiving the loops $b$, with an eye $e$ at the center for receiving the releasing-latch $f$, and a downwardly-curved loop $g$ at the upper end, adapted to engage the loop E, and furnished at its extremity with a loop $h$, through which the rope H passes. The wire hook is made double, the extremities of the wire forming the eyes $d$. The releasing-lever $f$ is also made of wire, with a projecting nib, beyond which the extremity is prolonged to form a guide for the loop E, when the device is operated in the manner presently to be described.

When the lamp F is raised by pulling the rope H, the loop E strikes the inclined face of the hook G, and as the said hook passes upward the loop drops into engagement with the hook of its own gravity. When the rope H is released, the lamp F remains suspended by the loop E and hook G. When it is desired to lower the lamp, the rope H is drawn until the loop E engages the nib of the releasing-lever $f$, as shown in Fig. 4, when the lamp will be lowered, causing the said lever to swing upwardly against the point of the hook, thereby closing the hook and allowing the loop E to pass without being engaged by the hook.

Although I have shown my improved device in connection with an electric lamp, I do not limit or confine myself to this use of it.

It is obvious that in lieu of the loop E, I may employ a link or a ring. Therefore I do not confine myself to any special form for this part of my apparatus.

Having thus described my invention, I claim as new and desire to secure by Letters Patent—

1. An electric-lamp hanger comprising a pulley-block, a suspension-loop pivoted upon the axis of the pulley and depending therefrom, a lamp-supporting hook engaging the lower end of the loop, a releasing-lever pivoted to the shank of the said hook, and an operating cord or cable, substantially as set forth.

2. An electric-lamp hanger comprising the laterally-swinging pulley-block D, its attaching-clip C, the loop E, pivotally suspended from the pulley-axis, the hook G, engaging the lower end of the loop, the releasing-lever $f$, and the loop $b$, depending from the lower end of hook G and adapted for connection with the lamp, and its operating cord or cable, substantially as set forth.

GEORGE ALBEE.

Witnesses:
E. W. JACKSON,
L. G. BENSON.